(12) United States Patent
Scherrer et al.

(10) Patent No.: US 12,306,027 B2
(45) Date of Patent: May 20, 2025

(54) METHOD FOR OPERATING A MEASURING DEVICE WITH AT LEAST ONE OSCILLATOR, AND MEASURING DEVICE FOR CARRYING OUT SAID METHOD

(71) Applicant: Endress+Hauser Flowtec AG, Reinach (CH)

(72) Inventors: Rémy Scherrer, Oberdorf (FR); Robert Lalla, Lörrach (DE); Reinhard Huber, Bad Säckingen (DE); Martin Josef Anklin, Dornach (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 311 days.

(21) Appl. No.: 17/642,481

(22) PCT Filed: Aug. 20, 2020

(86) PCT No.: PCT/EP2020/073395
§ 371 (c)(1),
(2) Date: Mar. 11, 2022

(87) PCT Pub. No.: WO2021/047887
PCT Pub. Date: Mar. 18, 2021

(65) Prior Publication Data
US 2022/0307884 A1    Sep. 29, 2022

(30) Foreign Application Priority Data
Sep. 13, 2019  (DE) ............. 10 2019 124 709.8

(51) Int. Cl.
*G01F 1/84*    (2006.01)
*G01F 15/02*    (2006.01)

(52) U.S. Cl.
CPC .......... *G01F 1/8436* (2013.01); *G01F 1/8472* (2013.01); *G01F 15/022* (2013.01)

(58) Field of Classification Search
CPC ..... G01F 1/8436; G01F 1/8472; G01F 15/022
(Continued)

(56) References Cited

U.S. PATENT DOCUMENTS

| 4,934,196 A | 6/1990 | Romano |
| 5,115,683 A * | 5/1992 | Pratt ................. G01F 1/8413 |
| | | 73/861.355 |

(Continued)

FOREIGN PATENT DOCUMENTS

| CN | 101198843 A | 6/2008 |
| CN | 101634661 A | 1/2010 |

(Continued)

*Primary Examiner* — Alexander A Mercado
*Assistant Examiner* — Rodney T Frank
(74) *Attorney, Agent, or Firm* — Brannon Sowers & Cracraft PC

(57) ABSTRACT

A method for operating a measuring device with a measuring sensor having an oscillator, the oscillator having a vibratory measuring tube for guiding a medium, comprises: Determining a current value of a resonance frequency for a vibration mode of the oscillator; exciting a vibration out of resonance with an excitation frequency that differs from the current value of the resonance frequency; and determining the amplitude of a sensor signal that represents the vibration out of resonance. The amplitude of the sensor signal of the vibration out of resonance, a sensor signal of a vibration sensor of the oscillator, is determined by a low-pass filter the time constant of which is not less than 1000 period lengths of the vibration out of resonance. Also disclosed is a measuring device for carrying out said method.

17 Claims, 3 Drawing Sheets

(58) Field of Classification Search
USPC .................................................. 73/861.356
See application file for complete search history.

(56) References Cited

U.S. PATENT DOCUMENTS

| | | | |
|---|---|---|---|
| 5,794,080 A * | 8/1998 | Watanabe | G01C 19/5649 310/317 |
| 6,311,136 B1 | 10/2001 | Henry et al. | |
| 2005/0229719 A1 | 10/2005 | Rieder et al. | |
| 2005/0274200 A1 | 12/2005 | Henry et al. | |
| 2010/0198531 A1 | 8/2010 | Bell et al. | |
| 2015/0268082 A1 | 9/2015 | Kirst et al. | |
| 2017/0082473 A1 | 3/2017 | Schollenberger et al. | |
| 2018/0209831 A1 | 7/2018 | Rensing | |
| 2019/0383657 A1 * | 12/2019 | Kumar | G01F 1/8477 |

FOREIGN PATENT DOCUMENTS

| | | |
|---|---|---|
| CN | 103534558 A | 1/2014 |
| CN | 104729606 A | 6/2015 |
| CN | 107850479 A | 3/2018 |
| CN | 110073177 A | 7/2019 |
| DE | 102017125273 A1 | 5/2019 |
| WO | 2009134830 A1 | 11/2009 |
| WO | 2012062551 A1 | 5/2012 |
| WO | 2018017080 A1 | 1/2018 |

* cited by examiner

METHOD FOR OPERATING A MEASURING DEVICE WITH AT LEAST ONE OSCILLATOR, AND MEASURING DEVICE FOR CARRYING OUT SAID METHOD

CROSS-REFERENCE TO RELATED APPLICATIONS

The present application is related to and claims the priority benefit of German Patent Application No. 10 2019 124 709.8, filed on Sep. 13, 2019, and International Patent Application No. PCT/EP2020/073395, filed on Aug. 20, 2020, the entire contents of which are incorporated herein by reference.

TECHNICAL FIELD

The present invention relates to a method for operating a measuring device, which has a measuring sensor with an oscillator, wherein the oscillator has at least one vibratory measuring tube for conducting a medium, wherein the measuring device serves especially for determining the mass flow rate, the density, and/or the viscosity of the medium. The invention furthermore relates to a measuring device for carrying out the method. The oscillators of generic measuring sensors are usually excited to vibrations with the resonance frequency of a usage mode. The amplitude of the vibration at resonance in relation to the excitation power enables statements about the quality of the oscillator, and thus about the viscosity of the medium. The resonance frequency of a bending vibration mode enables the determination of the density, and the amplitude of a superimposed vibration in the Coriolis mode, which can be detected in the form of a temporal offset between a vibration signal of an inlet-side vibration sensor and of an outlet-side vibration sensor, enables the mass flow rate to be determined. The determined values for the described measured variables are valid as long as the assumptions about the mechanical properties of the oscillator, which are reflected in coefficients of calculation models for the measured variables, apply. This is ensured when a measuring sensor is put into operation, but the mechanical properties can change for various reasons, depending upon the use conditions. It is therefore of interest to monitor the mechanical properties of the oscillator. In this respect, the international publication WO 2012 062551 A1, for example, teaches excitation out of resonance.

BACKGROUND

In the case of the usual values for the quality of the oscillator of at least some 100, the amplitude x, in the case of an excitation with s times the resonance frequency, for s>1.05 or s<0.95 is given as $x=F/(D*(s^2-1))$, where F is a modal excitation force and D is a modal stiffness. Transferred to measurable observables Us, Ie, and f, the following equation, for example, which defines a suitable monitoring variable H, is obtained, e.g.:

$$H:=Us/(Ie*f^2)=K/(D*(s^2-1)),$$

where K is a constant which especially bundles factors of the transfer functions between the excitation current Ie and the excitation force, as well as between the velocity of the oscillator and the sensor voltage Us of the electromagnetic sensors.

Apart from temperature dependencies and/or pressure dependencies that may have to be modeled, the modal stiffness D, in the case of an intact measuring sensor, does not change. Accordingly, for a given value of s, the ratio of observables given on the left side of the equation should not change.

In contrast, if changes are found in the ratio of the observables, this means that the modal stiffness D or the factor s or the variables underlying the constant K have changed. A changed modal stiffness can be caused, for example, by abrasion or corrosion; a deviating factor s would imply an error in the frequency control; a change in the factor K would indicate hardware faults in the sensor electronics, for example. Whatever the causes may be. In any case, such a deviation should be reliably recognized and signaled.

With the available excitation powers, it is not practical to measure a current value of the monitoring variable H and to simultaneously determine a mass flow measurement value with sufficient accuracy. It is therefore customary to determine a current value of the monitoring variable only on the occasion of occasional checks, when the measurement operation can be interrupted for a short time. The aim of the present invention is to find a remedy in this respect.

SUMMARY

The method according to the invention serves to operate a measuring device which has a measuring sensor with an oscillator, wherein the oscillator has at least one vibratory measuring tube for conducting a medium, wherein the measuring device serves especially for determining at least one of the measured variables of mass flow rate, density, and viscosity of the medium; wherein the method has the following steps:

determining a current value of a resonance frequency for a vibration mode of the oscillator;

exciting a vibration out of resonance with an excitation frequency that differs from the current value of the resonance frequency; and determining the amplitude of the sensor signal of the vibration out of resonance:

wherein the amplitude of the excitation current signal with which the vibration out of resonance is excited is not greater than the amplitude of the excitation current signal with which the resonance vibration is simultaneously excited;

wherein, in order to determine the amplitude of the sensor signal of the vibration out of resonance, a sensor signal of a vibration sensor of the oscillator is detected via a low-pass filter, the time constant of which is not less than 1,000 period lengths, e.g., not less than 10,000 period lengths, and especially not less than 100,000 period lengths, of the vibration out of resonance.

In a development of the invention, the vibration out of resonance is superimposed on a vibration at the resonance frequency.

In a development of the invention, the sensor signal of the vibration sensor is suppressed at the resonance frequency of the oscillator in order to determine the amplitude of the sensor signal of the vibration out of resonance by means of a filter, especially, by means of a notch filter.

In a development of the invention, the amplitude of the excitation current signal with which the vibration out of resonance is excited is not more than 4 mA—for example, not more than 1.5 mA.

In a development of the invention, the amplitude of the excitation current signal with which the vibration out of resonance is excited is not less than 0.25 mA, especially not less than 0.5 mA, and preferably not less than 0.75 mA.

In a development of the invention, the amplitude of the excitation current signal with which the vibration out of resonance is excited is not more than half, especially not more than one quarter, and especially not more than one eighth, of the amplitude of the excitation current signal with which the resonance vibration is simultaneously excited. These ratios of the excitation current signal amplitudes apply especially to measuring sensors with such a high power demand for exciting the resonance frequency that, in the case of a predetermined available electrical power, a larger share of current for the excitation of the vibration out of resonance would result in an impairment of the measurement performance for the measured variables of mass flow rate and/or density. This would be the case especially in the case of measuring sensors with stiff measuring tubes, i.e., generally speaking, for measuring sensors with larger nominal widths, e.g., from DN 50 and up.

In a development of the invention, a sampling frequency at which the sensor signals are sampled is not less than four times, e.g., not less than eight times, and especially not less than sixteen times, the resonance frequency of the oscillator.

In a development of the invention, a value of a transfer function is formed, which correlates the amplitude of the sensor signal of the vibration out of resonance with the amplitude of the excitation signal of the vibration out of resonance. In a currently preferred development of the invention, the excitation frequency of the vibration out of resonance differs from the resonance frequency by a constant factor s.

In an alternative embodiment, the excitation frequency of the vibration out of resonance can differ from the resonance frequency by an, in particular, constant offset. In this case, it is then still to be determined which factor s corresponds to the ratio of excitation frequency and resonance frequency, in order to achieve a proper interpretation of the relationship between the amplitude of the sensor signal of the vibration out of resonance and the amplitude of the excitation signal of the vibration out of resonance.

In a development of the invention, the excitation frequency of the vibration out of resonance differs from the current resonance frequency by at least 5% of the current resonance frequency.

In a development of the invention, the value of the transfer function represents a modal stiffness or flexibility of the oscillator.

In a development of the invention, in the determination of the transfer function, cross-sensitivities with regard to the oscillator with regard to the temperature, and of the pressure of the medium conducted in the measuring tube of the oscillator, as well as cross-sensitivities of the vibration sensor and of the exciter with regard to the temperature, are compensated for.

The measuring device according to the invention with a measuring sensor; and a measurement and operation circuit serves to determine a mass flow rate, a density, and/or a viscosity of a medium, wherein the measuring sensor comprises: an oscillator with at least one vibratory measuring tube for conducting the medium; at least one exciter for exciting measuring tube vibrations; at least one sensor for detecting measuring tube vibrations; wherein the measurement and operation circuit is configured to drive the exciter, to detect signals of the at least one sensor, and to carry out the method according to the invention.

BRIEF DESCRIPTION OF THE DRAWINGS

The invention is now explained on the basis of the exemplary embodiments shown in the drawings. The following are shown:

FIG. 1b shows differences between the resonance curves of FIG. 1a;

FIG. 2a shows a flowchart of an exemplary embodiment of the present present disclosure;

FIG. 2b shows a detailed flowchart for determining the amplitude of the vibration out of resonance in the exemplary embodiment of FIG. 2a;

DETAILED DESCRIPTION

Figure 1A:
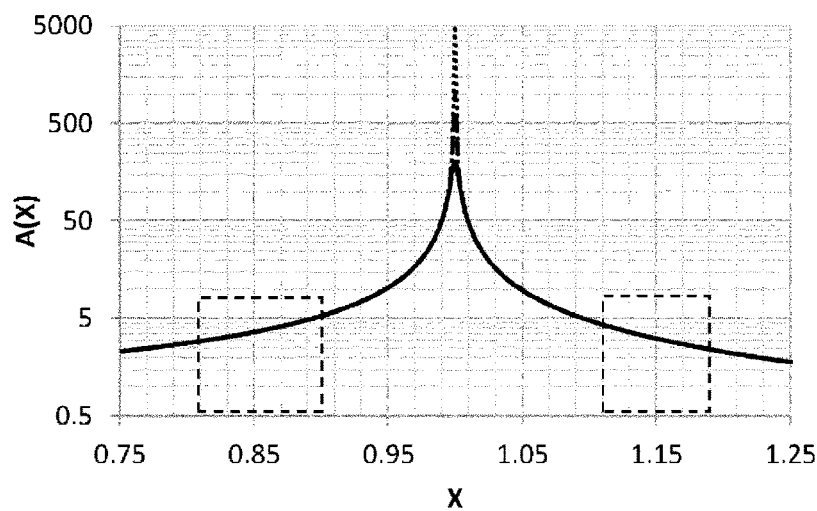
FIG. 1a shows resonance curves for oscillators of various qualities Q.
Figure 1B:
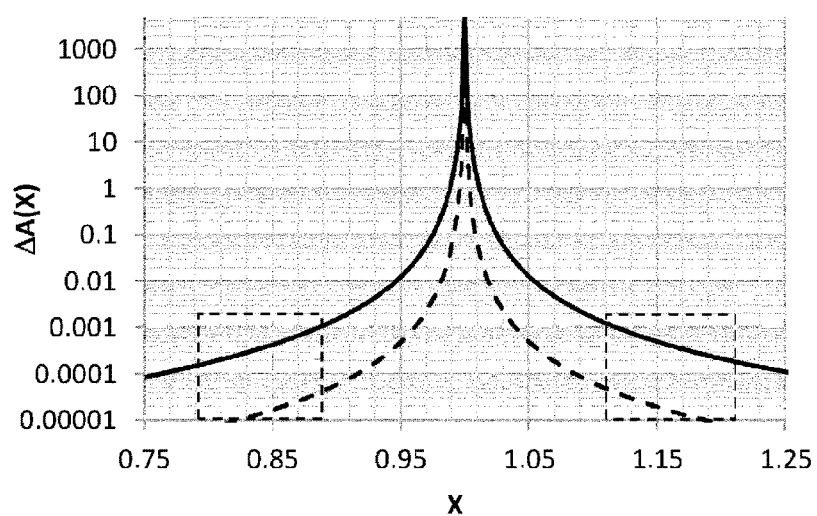
Figure 1C:
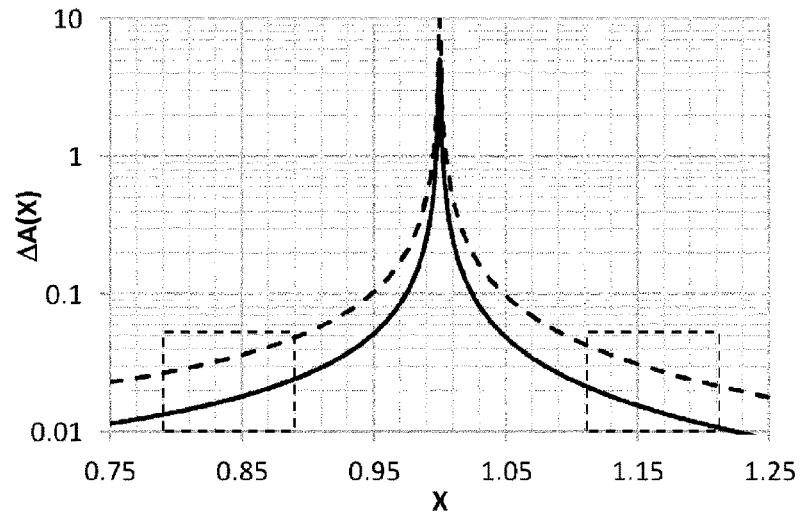
FIG. 1c shows differences between resonance curves of oscillators of the same quality, but changed stiffness.

With reference to FIGS. 1a through 1c, the basic procedure in the monitoring of the oscillator state is explained.

The resonance curves shown in FIG. 1a originate from oscillators that differ only in their quality, which assumes values of Q=200, Q=1,000, or Q=5,000. These are typical values which can occur during operation of a Coriolis mass flowmeter. The amplitude A(X) is here shown with the same force in relation to the amplitude A(0) in the case of static deflection. The normalized excitation frequency X=f/f0 is plotted on the abscissa, wherein f0 is the natural frequency of the vibration mode of the oscillator under consideration.

FIG. 1b shows differences of resonance curves of FIG. 1a, wherein, in each case, the curves for Q=200 and Q=1,000 were subtracted from the curve for Q=5,000. In the regions marked by hatched boxes above and below the resonance peak at X=1, changes in the quality practically no longer have an effect; even a change in the quality of Q=5,000 to Q=200 causes an amplitude change of less than 0.1%.

FIG. 1c shows differences of resonance curves for a quality of Q=1,000 for different measuring tube stiffnesses that are 99.5% or 99.0% of the reference stiffness. The difference curves are normalized to the static deflection (X=0) of an oscillator having an initial stiffness of 100%. It can be seen from a comparison of the difference curves of 1b and 1c that the effect of the described stiffness changes is stronger at a sufficient distance from the resonance peak by several orders of magnitude than the effect of the quality changes. Therefore, by observing the vibration amplitudes, e.g., in the marked frequency ranges, the mechanical integrity of the oscillator can be monitored. However, since the absolute value of the amplitude in the mentioned frequency ranges is very low, as shown in FIG. 1a, an amplitude measurement in accordance with the prior art is carried out only for particular diagnostic procedures in which the measurement operation is possible at best to a limited extent. In a diagnostic procedure, the vibration in a frequency range of X>1.1 or X<0.9 is supplied with a large excitation power in order to achieve an amplitude sufficient for measurement during the diagnostic procedure. This is disadvantageous insofar as faults may be recognized only late, viz., only when a diagnosis after the occurrence of a fault is performed. In addition, the data basis for statistical analyses is very small.

In contrast, the method according to the invention is based upon exciting the vibration out of resonance with very low power, as a result of which the ongoing measurement operation at the resonance frequency is, firstly, practically not disturbed thereby, and, secondly, continuous monitoring of the oscillator is possible. Insofar as the signal component of the vibration out of resonance in the sensor signals is, for example, approximately eighty decibels lower than the signal component of the resonance vibration, particular measures are taken to determine the desired information, viz., the amplitude of the vibration out of resonance.

An exemplary embodiment of the method 100 according to the invention is shown in FIG. 2a. The current resonance frequency of the oscillator is continuously determined 110 by regulating the excitation of a bending vibration usage mode according to a resonance criterion. This can, for example, be the amplitude maximization or a phase angle of 90° between the excitation signal and the deflection of the oscillator or 0° between the excitation signal and the velocity signal of the oscillator. The excitation at resonance is continuously superimposed 120 with an excitation out of resonance, especially with a constant amplitude, wherein the excitation out of resonance takes place at an excitation frequency that differs from the resonance frequency by a constant factor s, wherein, for example, s≤0.9 or s≥1.1. The excitation force for the excitation out of resonance is no more than, for example, one tenth of the excitation force of the excitation at resonance.

Subsequently, an amplitude signal of the oscillator vibration out of resonance is determined 130.

A ratio of the determined amplitude signal to the excitation signal is formed, and, at 140, a correction with respect to cross-sensitivities, such as temperature, pressure, and/or aging of the sensors or exciters is carried out if necessary. Suitable correction functions are disclosed, for example, in the yet unpublished German patent application with file number DE 10 2019 122 094.7. The data prepared in this way are recorded and are available for further evaluations, such as trend analyses and threshold value comparisons 150.

Figure 2B:
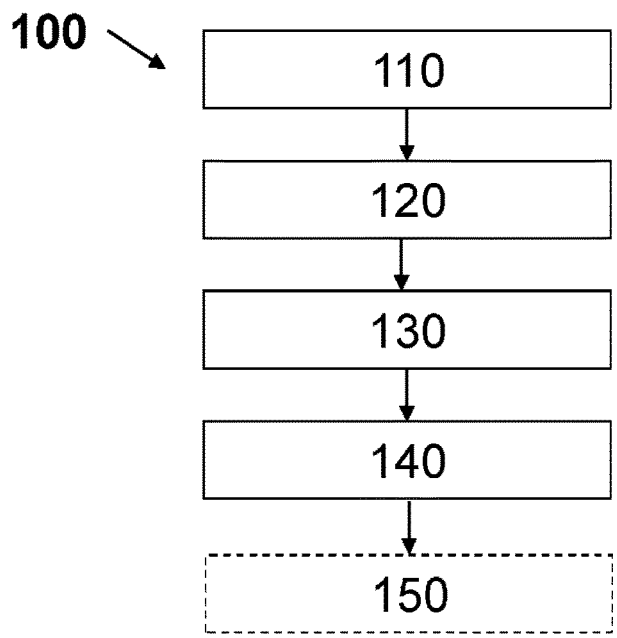
Figure 2B:
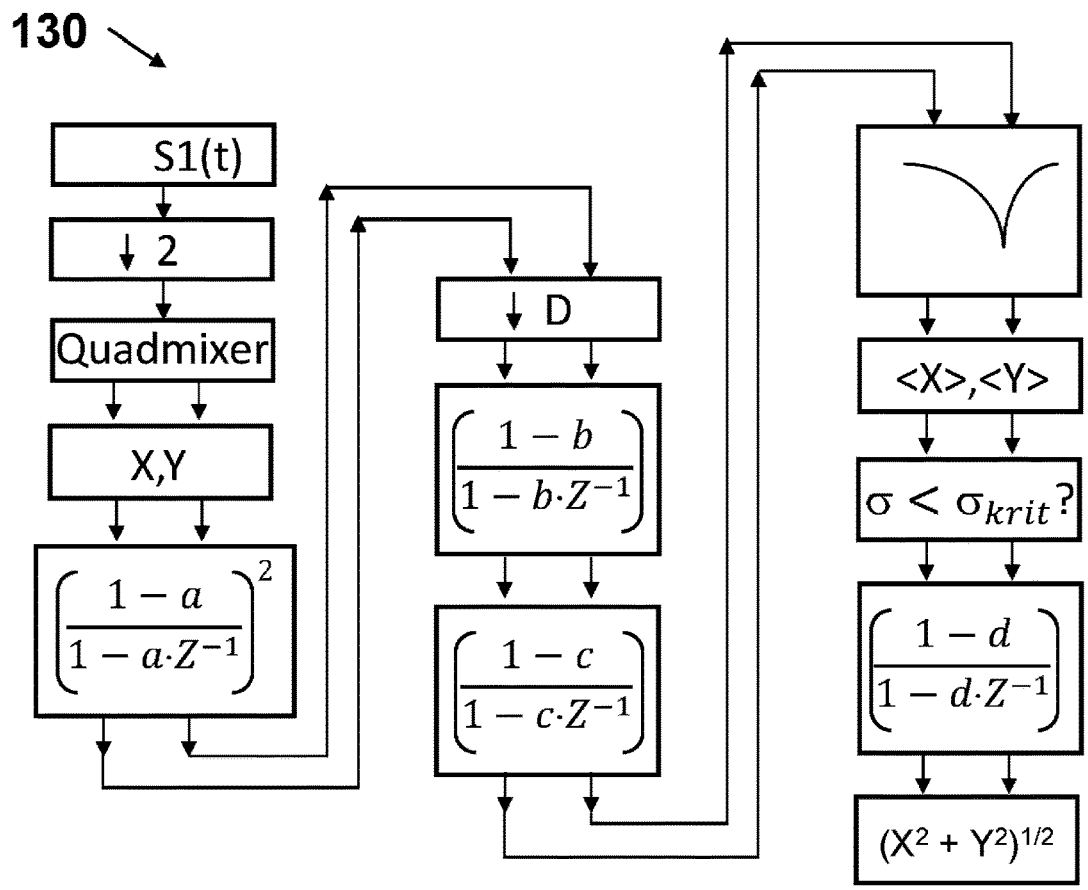

The determination of the amplitude signal 130 is now explained in more detail with reference to FIG. 2b.

An analog sensor signal $S1(t)$, whose amplitude is proportional to the vibration amplitude of the measuring tube, is sampled at a sampling frequency of, for example, 32 kHz. After a decimation by a factor of 2, two sequences (X, Y) of digital values with a repetition frequency of 16 kHz are provided by means of a quadrature mixer, said sequences being phase-shifted in relation to one another by 90°, relative to the frequency of the excitation out of resonance. The two sequences are used by means of a filter sequence of type $T(Z, w) = ((1-w)/(1-wZ^{-1}))$, where w=a, b, c, d are different weighting coefficients.

Between a first filter stage $(T(Z, a))^2$ and a second filter stage $T(Z, b)$, a further decimation takes place at a frequency of 2 KHz or 1 KHz.

After a third filter stage $T(Z, c)$, a notch filter is used in order to suppress the signal in the case of vibration at the resonance frequency, which is stronger by some orders of magnitude, e.g., approximately 80 dB, than the signal of the vibration out of resonance of interest.

Subsequently, a further temporal mean value formation takes place at a frequency of 54 Hz.

The mean values X, Y are detected over one second, and their standard deviation is determined. If the standard deviation is below a threshold value, the mean values averaged over one second, and, optionally, after further compensations for cross-sensitivities, are fed to a further long-term analysis; otherwise, they are discarded. The long-term analysis comprises a filter stage $T(Z, d)$ and takes into account values over a period of time on the order of magnitude of 1,000 seconds. On the basis of the values prepared in this way for X and Y, the amplitude A of the vibration signal out of resonance is finally determined according to $A=(X^2+Y^2)^{1/2}$. This amplitude should be constant in relation to the excitation signal of the vibration out of resonance.

The cross-sensitivities to be considered relate, for example, to the temperature of the exciter or of the sensors and/or of the measuring tube, and to the media pressure prevailing in the measuring tube. Finally, the density or the resonance frequency also has an influence on the sensor signal if the vibration sensor is an electromagnetic sensor. In this case, the vibration signal represents a velocity which is proportional, firstly, to the desired amplitude of the deflection and, secondly, to the density-dependent vibration frequency.

The filter stages upstream of the notch filter can be implemented as fixed point filters, especially with 32 bits or 64 bits, whereas a floating point filter stage is currently preferred for the last filter stage.

Figure 3:
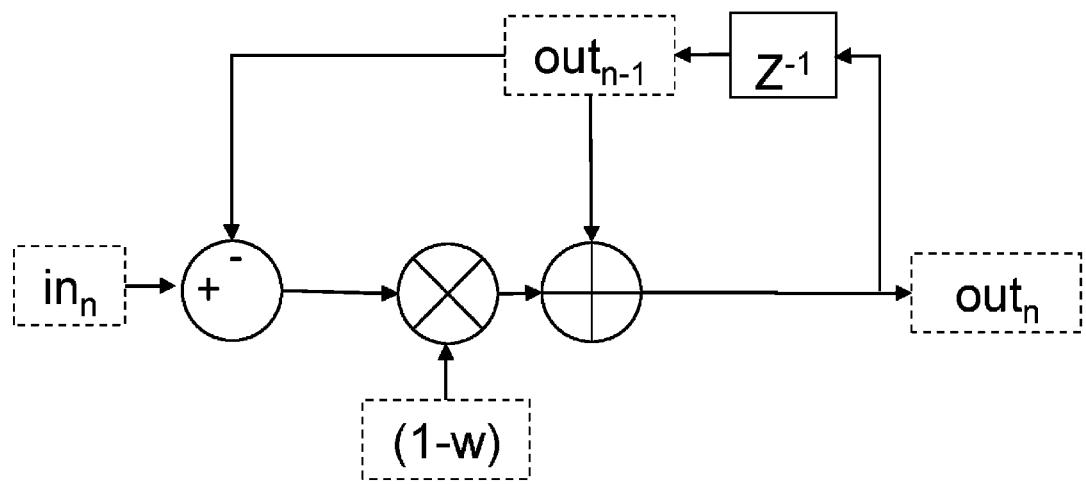
FIG. 3 shows a schematic illustration of a filter stage which is used in the above exemplary embodiment.

An implementation of the filter stage $T(Z, w)$ is shown in FIG. 3. This arrangement results in the nth output value $out_n$ of the filter stage from the previous output value $out_{n-1}$ and the nth input value $in_n$ of the filter stage:

$$out_n = (1-w) \times (in_n - out_{n-1}) + out_{n-1}.$$

The factor 1−w can be represented in the fixed point calculation as $$1-w = (2^L - 2^N)/2^L,$$

where L=32 and N=18 . . . 24, for example.

With the described method, the ratio between the amplitude of the vibration out of resonance and the associated excitation current at a minimum of, for example, only 1 mA can be determined sufficiently precisely in order to be able to therefrom changes in the measuring tube at an early stage. Due to the low power consumption for this monitoring function, sufficient power remains available to excite the measuring tube vibrations at resonance and thus to fulfill the actual measuring tasks of the measuring sensor.

Figure 4:
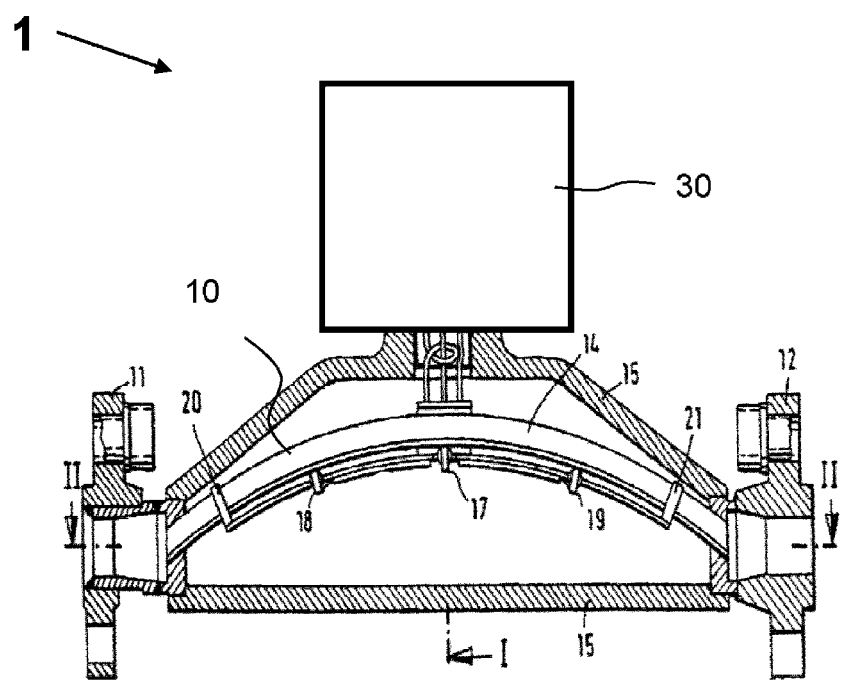
FIG. 4 shows a schematic illustration of an exemplary embodiment of a measuring device according to the present disclosure.

The exemplary embodiment of a measuring device 1 according to the invention shown in FIG. 4 comprises an oscillator 10, which comprises a pair of vibratory measuring tubes 14 conducted in parallel, which extend between an inlet-side flange 11 and an outlet-side flange 12, wherein the flanges each comprise a flow divider or collector into which the measuring tubes 14 open. The flow dividers are connected to one another by a rigid housing 15, such that vibrations of the flow dividers accommodating the measuring tubes are effectively suppressed in the range of vibration frequencies of useful bending vibration modes of the oscillator. The measuring tubes 10 are rigidly connected to an inlet-side node plate 20 and an outlet-side node plate 21, wherein the node plates define vibration nodes of the oscillator 10 formed by the two measuring tubes 14, and thus largely establish the frequencies of the useful bending vibration modes. The oscillator 10 is excited to vibration by an electrodynamic exciter 17 acting between the two measuring tubes 14, wherein the vibrations are detected by means of two vibration sensors 18, 19 that detect relative movements of the measuring tubes 14 in relation to one another. The exciter 17 is operated by an operation and evaluation circuit 30, wherein the latter also detects and evaluates the signals of the vibration sensors in order to determine a density measurement value and, optionally, a mass flow rate measurement value. According to the invention, the operation and evaluation circuit 30 is likewise configured to carry out the method according to the invention, i.e., especially, to determine an amplitude of a vibration out of resonance and to correlate it with an excitation signal which represents an excitation force. Unlike what is shown in FIG. 4, the operation and evaluation circuit may also comprise several, spatially-separated modules. The amplitude of the vibration out of resonance can thus also be calculated in a remote computing module, to which the required raw data are transmitted—for example, wirelessly.

The invention claimed is:

1. A method for operating a measuring device having a measuring sensor having an oscillator, wherein the oscillator includes a vibratory measuring tube for conducting a medium, the method comprising:
   determining a current value of a resonance frequency for a vibration mode of the oscillator;
   exciting a resonance vibration of the oscillator with an excitation current signal;
   exciting a vibration of the oscillator that is out of resonance, with another excitation current signal and with an excitation frequency that differs from the current value of the resonance frequency, and wherein the vibration out of resonance is superimposed on a vibration at the resonance frequency; wherein the resonance vibration and the vibration out of resonance are excited simultaneously;
   detecting via a low-pass filter a sensor signal of a vibration sensor of the oscillator, wherein a time constant of the low pass filter is not less than 1,000 period lengths of the vibration out of resonance;
   determining an amplitude of the sensor signal which represents the vibration out of resonance; and
   determining a change to a stiffness or a flexibility of the oscillator has occurred, based on the determined amplitude of the sensor signal.

2. The method according to claim 1,
   wherein an amplitude of the excitation current signal with which the vibration out of resonance is excited is not greater than an amplitude of the excitation current signal with which the resonance vibration is simultaneously excited, and
   wherein the amplitude of the excitation current signal with which the vibration out of resonance is excited is not more than 4 mA.

3. The method according to claim 1, further comprising:
   suppressing the sensor signal of the vibration sensor at the resonance frequency of the oscillator to determine the amplitude of the sensor signal of the vibration out of resonance via a notch filter.

4. The method according to claim 2, wherein the amplitude of the excitation current signal with which the vibration out of resonance is excited is not less than 0.25 mA.

5. The method according to claim 2, wherein the amplitude of the excitation current signal with which the vibration out of resonance is excited is not more than half of the amplitude of the excitation current signal with which the resonance vibration is simultaneously excited.

6. The method according to claim 1, wherein a sampling frequency at which the sensor signals are sampled is not less than four times the resonance frequency of the oscillator.

7. The method according to claim 6, further comprising:
   determining a value of a transfer function that correlates the amplitude of the sensor signal of the vibration out of resonance with the amplitude of the excitation signal of the vibration out of resonance.

8. The method according to claim 7, wherein the value of the transfer function represents a modal stiffness or flexibility of the oscillator.

9. The method according to claim 8, wherein, in the determination of the transfer function, cross-sensitivities with regard to the oscillator with regard to the temperature, and of the pressure of the medium conducted in the measuring tube of the oscillator, as well as cross-sensitivities of the vibration sensor and of the exciter with regard to the temperature, are compensated for.

10. The method according to claim 1, wherein the excitation frequency of the vibration out of resonance differs from the resonance frequency by at least 5% of the resonance frequency.

11. The method according to claim 1, wherein the excitation frequency of the vibration out of resonance differs from the current value of the resonance frequency by a constant factor s.

12. The method of claim 1 further comprising determining a ratio between the amplitude of the vibration out of resonance and an amplitude of an excitation current signal with which the vibration out of resonance is excited.

13. The method of claim 1 further comprising exciting the oscillator at the resonance frequency, and performing an ongoing measurement operation at the resonance frequency during the determining the amplitude of the sensor signal which represents the vibration out of resonance.

14. A measuring device for determining a mass flow rate, a density, and/or viscosity of a medium, comprising:
   a measuring sensor, including:
   an oscillator having a vibratory measuring tube for conducting the medium;
   an exciter for exciting measuring tube vibrations; and
   a sensor for detecting measuring tube vibrations; and
   a measurement and operation circuit configured to:
   drive the exciter:
   detect signals of the sensor to determine a current value of a resonance frequency for a vibration mode of the oscillator;
   excite a resonance vibration of the oscillator with an excitation current signal;
   excite a vibration of the oscillator out of resonance, with another excitation current signal and with an excitation frequency that differs from the current value of the resonance frequency, and wherein the vibration out of resonance is superimposed on the vibration at the resonance frequency; wherein the resonance vibration and the vibration out of resonance are excited simultaneously;
   detect via a low-pass filter a sensor signal which represents the vibration of the oscillator out of resonance, wherein a time constant of the low pass filter is not less than 1,000 period lengths of the vibration out of resonance;
   determine an amplitude of the sensor signal which represents the vibration out of resonance; and
   determine a change to a stiffness or a flexibility of the oscillator has occurred, based on the determined amplitude of the sensor signal.

15. A method for operating a measuring device with a measuring sensor which has at least one oscillator, wherein the oscillator has at least one oscillating measuring tube for guiding a medium, the method comprising;
   determining a current value of a resonant frequency for an oscillation mode of the oscillator;
   exciting a resonant oscillation of the oscillator;
   exciting an oscillation of the oscillator out of resonance at an excitation frequency different from the current value of the resonance frequency; and determining the amplitude of a sensor signal which represents the oscillation out of resonance;

characterized in that:

an amplitude of an excitation current signal with which the oscillation is excited out of resonance is not more than half an amplitude of an excitation current signal with which the resonant oscillation is simultaneously excited; and to determine the amplitude of the sensor signal of the oscillation out of resonance, a sensor signal of an oscillation sensor of the oscillator is detected via a low-pass filter, the time constant of which is not less than 1000 period durations of the oscillation out of resonance.

16. The method of claim 15 wherein the time constant is not less than 10,000 period durations of the oscillation out of resonance.

17. The method of claim 16 wherein the time constant is not less than 100,000 period durations of the oscillation out of resonance.

\* \* \* \* \*